United States Patent
Munger et al.

[11] Patent Number: 6,164,154
[45] Date of Patent: Dec. 26, 2000

[54] ADJUSTABLE PEDAL WITH CABLE ASSEMBLY

[75] Inventors: Jean Munger, Royal Oak; Christopher A. Bortolon, Clawson, both of Mich.

[73] Assignee: Teleflex Incorporated, Plymouth Meeting, Pa.

[21] Appl. No.: 09/335,112

[22] Filed: Jun. 17, 1999

[51] Int. Cl.[7] .................................................. G05G 1/14
[52] U.S. Cl. ...................... 74/512; 74/502.4; 74/502.5
[58] Field of Search ......................... 74/502.4, 502.5, 74/478.5, 512, 560, 566, 513, 519

[56] References Cited

U.S. PATENT DOCUMENTS

| | | | |
|---|---|---|---|
| 2,847,872 | 8/1958 | Todd | 74/478 |
| 2,853,164 | 9/1958 | Sturdy | 192/3 |
| 3,288,239 | 11/1966 | Ristau | 180/78 |
| 3,314,405 | 4/1967 | Irgens | 123/108 |
| 3,361,165 | 1/1968 | Irgens | 143/32 |
| 3,643,524 | 2/1972 | Herring | 74/512 |
| 3,643,525 | 2/1972 | Gibas | 74/512 |
| 3,691,868 | 9/1972 | Smith | 74/512 |
| 3,754,480 | 8/1973 | Bodnar et al. | 74/512 |
| 3,986,363 | 10/1976 | Beaman et al. | 60/700 |
| 4,007,647 | 2/1977 | Carlson | 74/501 |
| 4,182,198 | 1/1980 | Dartnell | 74/560 X |
| 4,870,871 | 10/1989 | Ivan | 74/560 X |
| 4,875,384 | 10/1989 | Hirayama et al. | 74/500 |
| 4,889,005 | 12/1989 | Crack | 74/502.4 X |
| 5,546,827 | 8/1996 | Pospisil | 74/502.4 |
| 5,722,302 | 3/1998 | Rixon et al. | 74/512 |
| 5,913,946 | 6/1999 | Ewing | 74/512 X |
| 6,014,910 | 1/2000 | Oda et al. | 74/502.4 X |

*Primary Examiner*—Richard M. Lorence
*Assistant Examiner*—Saél Rodriguez
*Attorney, Agent, or Firm*—Howard & Howard

[57] ABSTRACT

A pedal carrier (14) is movably supported by the support (12) for adjustment between various operational positions. The support (12) includes a rod (16) and the pedal carrier (14) is slidably supported on the rod (16). The carrier (12) includes an arm (30) extending from the support (12) and a fitting defining a first end (26) of a conduit (24) is retained in an aperture in the arm (30). A pedal lever (20) includes an actuator portion (38) extending upwardly from a pivotal pin (22) and a first end (34) of a core element (32) is attached to the actuator portion (38). The pedal lever (20) also includes a pedal portion (40) extending downwardly from the pivotal pin (22) so that the pin (22) acts as a fulcrum in response to a pedal force applied to the pedal portion (40) to place the core element (32) in tension. A boot (46) is disposed between the conduit (24) and the bulkhead (52) through which the conduit passes to seal the conduit (24) to the bulkhead as the conduit (24) is allowed to move longitudinally relative to the bulkhead (52).

4 Claims, 3 Drawing Sheets

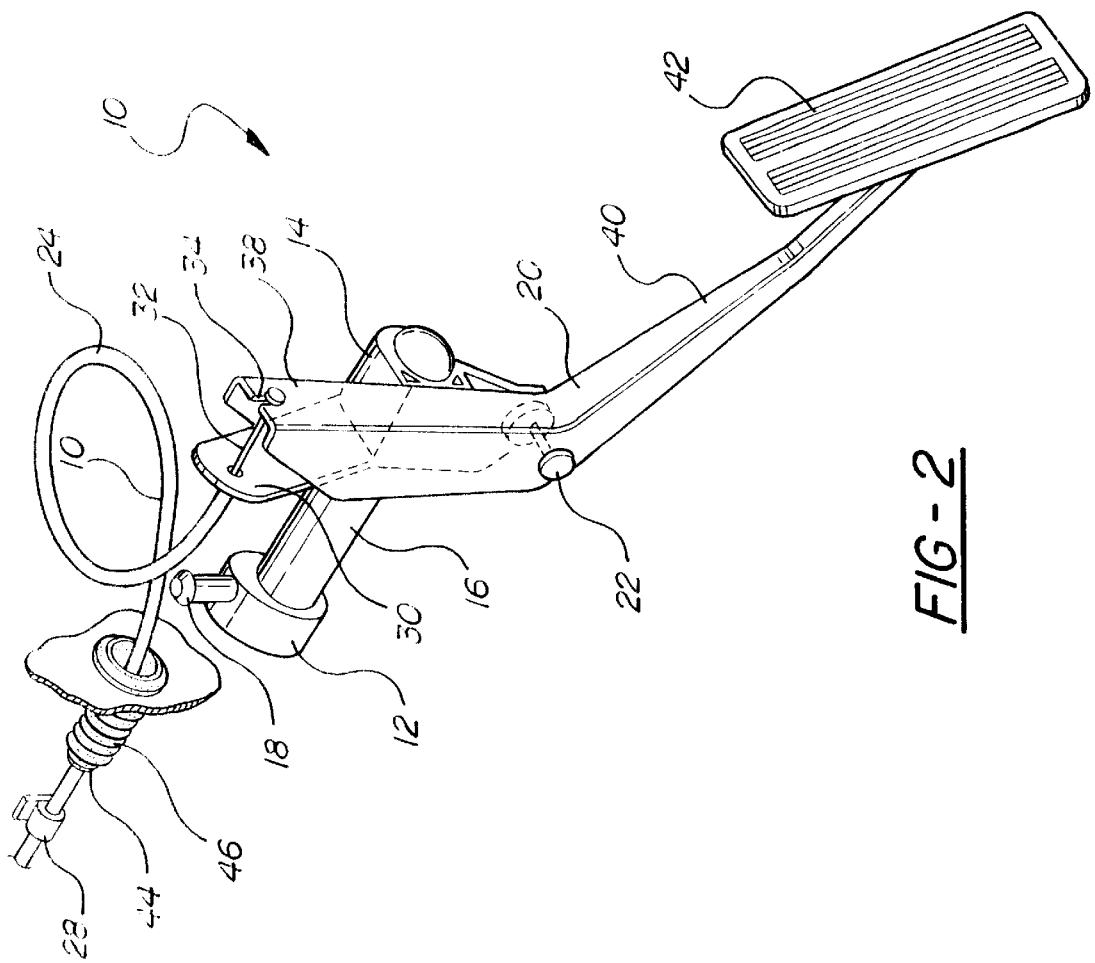
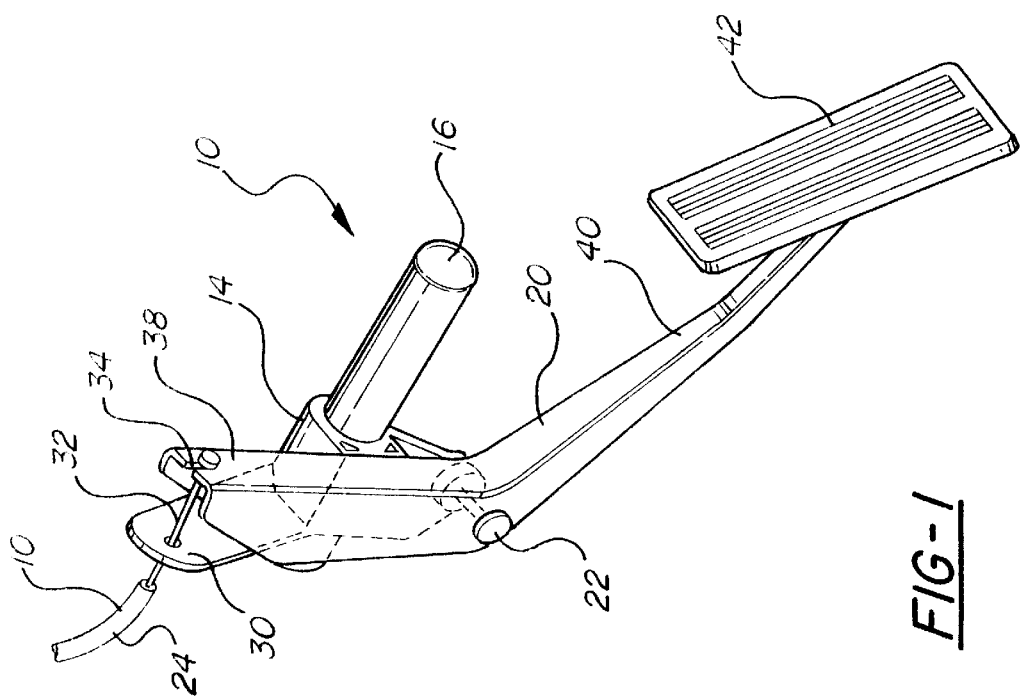

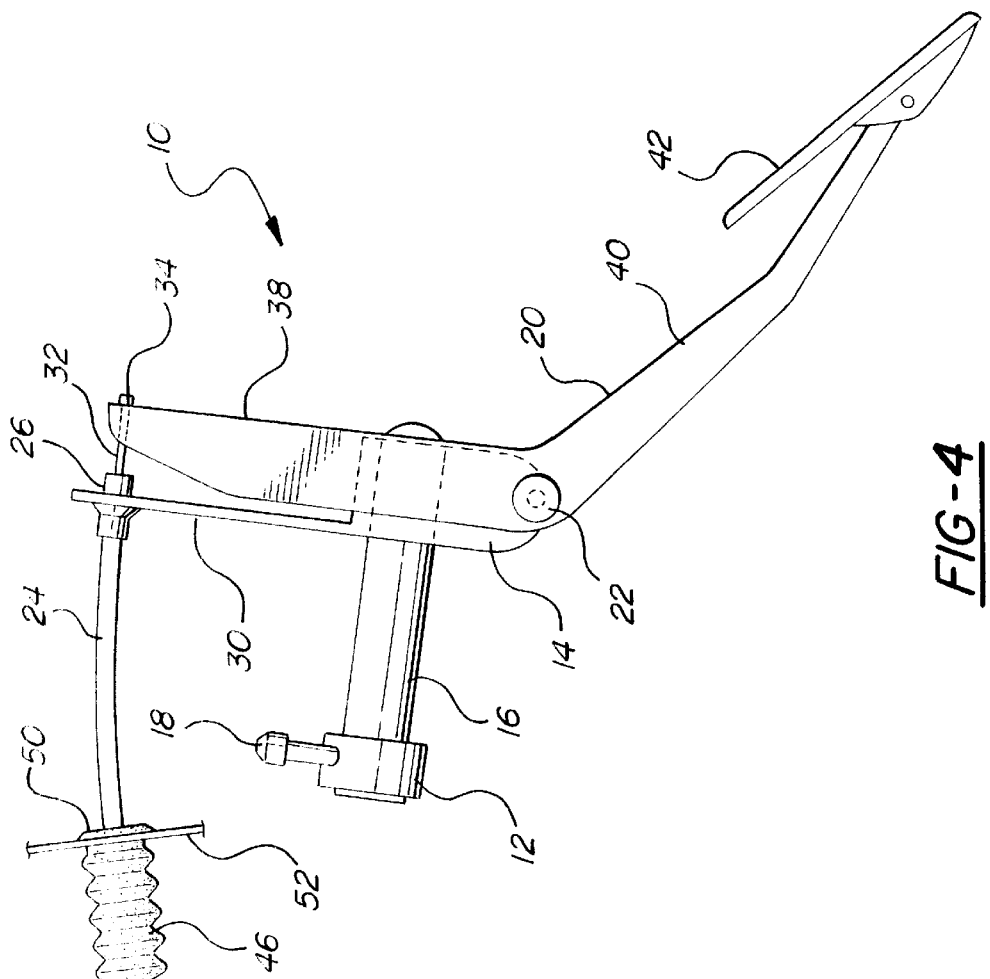
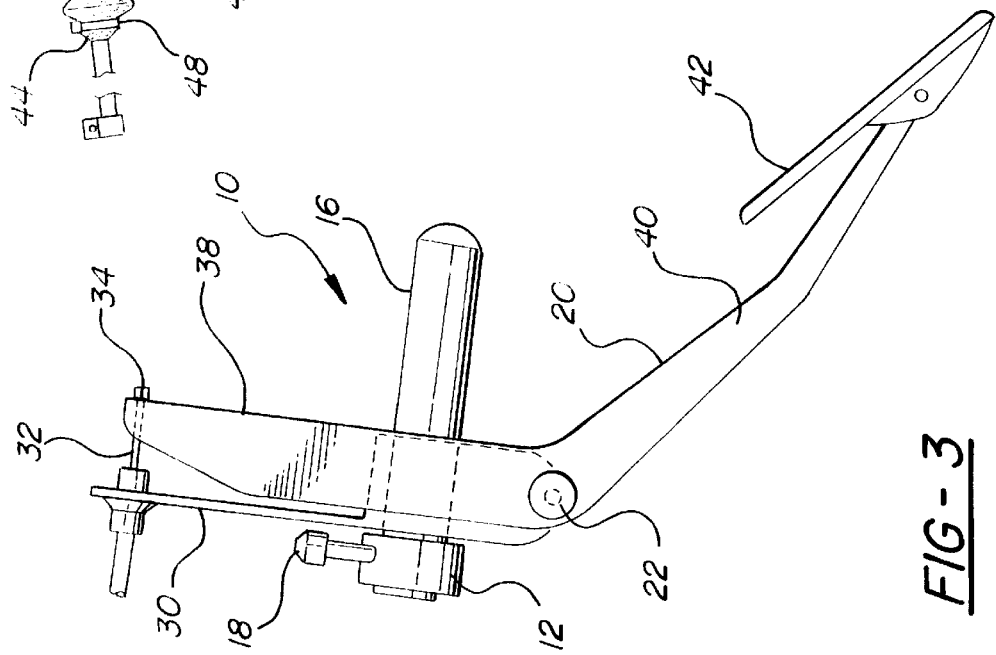

6,164,154

ADJUSTABLE PEDAL WITH CABLE ASSEMBLY

BACKGROUND OF THE INVENTION

1. Field of the Invention

The subject invention relates to an adjustable pedal assembly for use in automotive vehicles wherein the pedal position may be changed to accommodate various drivers.

2. Description of the Prior Art

The concept of an adjustable pedal for automotive vehicles has been known for some time but is just recently being accepted. Such assemblies include a support for attachment to the vehicle and a carrier supporting a pedal lever for pivotal movement during normal operation, e.g., applying the brakes. The pedal lever is attached to a mechanism for transmitting the pedal lever movement to some component of the vehicle, such as the brakes. A problem is that of the mechanism being capable of maintaining the movement of the vehicle component in proportion to the movement of the pedal lever regardless of the adjusted position of the carrier on the support.

SUMMARY OF THE INVENTION AND ADVANTAGES

An adjustable pedal assembly comprising a support for attachment to a vehicle structure, a pedal carrier movably supported by the support for adjustment between various operational positions, and a pedal lever movably supported by the carrier for operational movement relative to the carrier in anyone of the operational positions. A conduit has a first end attached to the carrier for movement therewith during the adjustment between the operational positions and a second end for attachment to support structure. A motion transmitting core element is slidably supported by the conduit and has a first end extending from the first end of the conduit and attached to the pedal lever and a second end extending from the second end of the conduit for attachment to a control member for transmitting motion from the pedal lever to the control member.

Accordingly, the subject invention provides an adjustable pedal assembly which may be adjusted between various operating positions while maintaining the operative and proportional connection between the pedal and the vehicle component to be controlled. This is accomplished in a simple and inexpensive assembly which may be easily installed into the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a preferred embodiment in an inward operational position;

FIG. 2 is a perspective view of the preferred embodiment in an outward operational position;

FIG. 3 is a side elevational view corresponding to the position of FIG. 1;

FIG. 4 is a side elevational view corresponding to the position of FIG. 2; and

DETAILED DESCRIPTION OF THE PREFERRED EMBODIMENT

Figure 5:
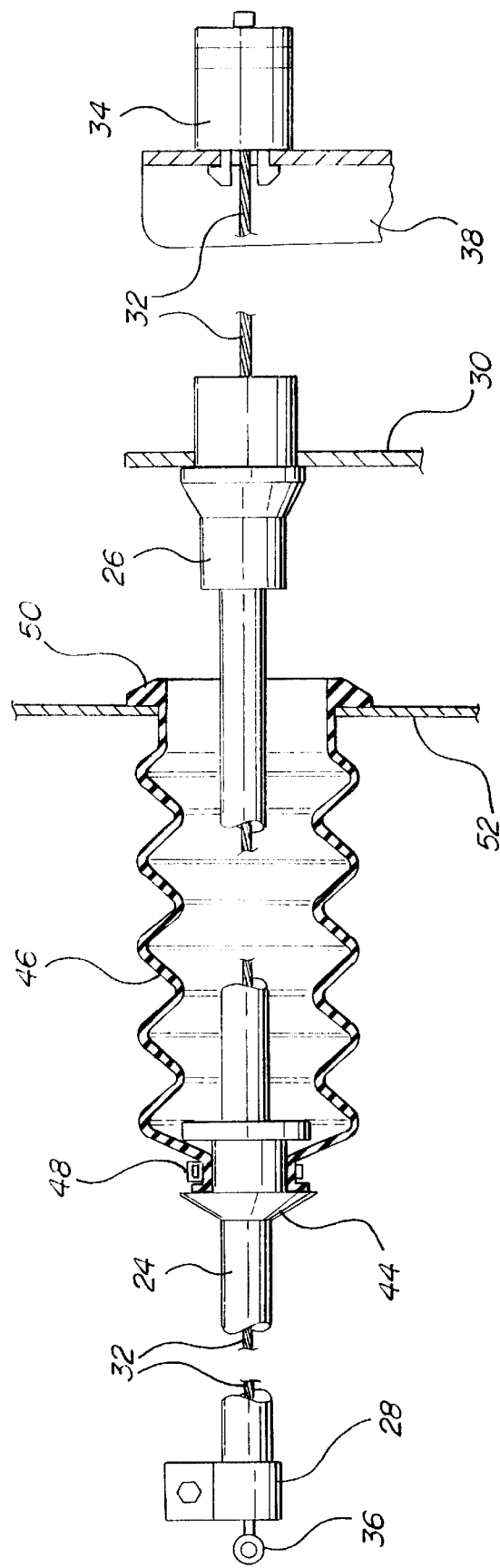
FIG. 5 is a fragmentary and cross sectional view showing the boot in the assembly.

Referring to the Figures, wherein like numerals indicate like or corresponding parts throughout the several views, an adjustable pedal assembly is generally shown at 10.

The adjustable pedal assembly 10 comprises a support 12 for attachment to a vehicle structure (not shown). A pedal carrier 14 is movably supported by the support 12 for adjustment between various operational positions between the fully retracted or inward position shown in FIGS. 1 and 3 and the fully extended or outward position shown in FIGS. 2 and 4. The support 12 includes a rod 16 and the carrier 14 is slidably supported on the rod 16. The carrier 14 is adjusted to various operational positions along the rod 16 by a nut and screw as is well known in the art, samples of which is shown in U.S. Pat. No. 5,632,183 to Rixon et al and U.S Pat. No. 5,819,593 to Rixon et al. The support 12 also includes a connection means 18 for attaching the support 12 to vehicle structure.

A pedal lever 20 is movably supported by the carrier 14 for operational movement relative to the carrier 14 in anyone of the operational positions between the extreme positions shown respectively in FIGS. 1 and 3 and in FIGS. 2 and 4. A pivotal connection comprising a pin 22 pivotally supports the pedal lever 20 on the carrier 14 for the operational movement. Although the pivotal connection is illustrated as a pin 22, it will be appreciated that the pivotal connection may comprise other connections which allow either rotary, swinging or rectilinear movement of the pedal lever 20 relative to the carrier 14.

The assembly 10 includes a conduit 24 having a first end 26 attached to the carrier 14 for movement therewith during the adjustment between the operational positions and a second end 28 for attachment to support structure (not shown). The first end 26, as best shown in FIG. 5, includes a fitting molded about the conduit 24 for insertion in an aperture in the carrier 12. More specifically, the carrier 12 includes an arm 30 extending from the support 12 and the fitting defining the first end 26 of the conduit 24 is retained in an aperture in the arm 30.

A motion transmitting core element 32 is slidably supported in and by the conduit 24 and has a first end 34 extending from the first end 26 of the conduit 24 and attached to the pedal lever 20 and a second end 36 extending from the second end 28 of the conduit 24 for attachment to a control member (not shown) for transmitting motion from the pedal lever 20 to the control member. More specifically, the pedal lever 20 includes an actuator portion 38 extending in a first direction from the pivotal connection defined by the pin 22 and the first end 34 of the core element 32 is attached to the actuator portion 38 a first predetermined distance from the pivotal connection the first end 34 of the core element 32. The first end 34 of the core element 32 is defined by a connector inserted into an aperture in the actuator portion 38.

The arm 30 extends from the support 12 in parallel and spaced relationship to the actuator portion 38 and the first end 26 of the conduit 24 is attached to the arm 30. Actually, the arm 30 and the actuator portion 38 diverge from one another and generally from the pivotal connection defined by the pin 22. The pedal lever 20 also includes a pedal portion 40 extending in a second direction from the pivotal connection defined by the pin 22 so that the pin 22 acts as a fulcrum in response to a pedal force applied to the pedal portion 40 to place the core element 32 in tension. The pin 22 interconnects the carrier 14 and the pedal lever 20 below the rod 16 and the arm 30 extends above the rod 16 from the carrier 14 and the actuator portion 38 of the pedal lever 20 extends above the rod 16 from the pin 22. A pedal 42 of the type well known is attached to the lower or distal end of the actuator portion 38.

The assembly 10 may also include a boot collar 44 disposed on the conduit 24 for attachment to a boot 46. The boot 46 includes a collar end disposed about the collar 44 and a tie strap 48 binds the annular portion of the boot 46 to the boot collar 44. The boot 46 has a bulkhead end 50 for attachment to the periphery of an aperture in a bulkhead 52. The boot 46 includes bellows between the ends thereof for longitudinal extension and collapse, as is well known for such boots. In some cases, the conduit 24 may include a loop on the interior side of the bulkhead 52, in which case the boot may not be necessary as the conduit is sealed directly to the bulkhead 52 without need for the conduit 24 to move longitudinally relative to the bulkhead 52. On the other hand, the boot 46 will be used in those installations where the conduit moves longitudinally relative to the bulkhead 52.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein that which is prior art is antecedent to the characterized novelty and reference numerals are merely for convenience and are not to be in any way limiting, the invention may be practiced otherwise than as specifically described.

What is claimed is:

1. An adjustable pedal assembly comprising;

a support (12) for attachment to a vehicle structure, a pedal carrier (14) movably supported by said support (12) for adjustment along a path between various operational positions, a pedal lever (20) slidably supported by said carrier (14) at a pivotal connection (22) for operational movement relative to said carrier (14) in anyone of said operational positions, said pivotal connection (22) being below said path of movement of said carrier (14) between said adjusted positions, said pedal lever (20) including an actuator portion (38) extending in an upward direction from said pivotal connection (22) and upwardly from said path of movement of said carrier (14), said carrier (14) including an arm (30) extending upwardly from said path of movement of said carrier (14) and in spaced and generally parallel relationship to said actuator portion (38), a conduit (24) having a first end (26) attached to said arm (30) for movement therewith during said adjustment between said operational positions and a second end (28) for attachment to support structure, and a motion transmitting core element (32) slidably supported by said conduit (24) and having a first end (34) extending from said first end (26) of said conduit (24) and attached to said actuator portion (38) a first predetermined distance from said pivotal connection (22) and a second end (36) extending from said second end (28) of said conduit (24) for transmitting motion from said pedal lever (20).

2. An assembly as set forth in claim 1 wherein said pedal lever (20) includes a pedal portion (40) extending in a second direction from said pivotal connection so that said pivotal connection acts as a fulcrum in response to a pedal force applied to said pedal portion (40) to place said core element (32) in tension.

3. An adjustable pedal assembly comprising;

a support (12) for attachment to a vehicle structure, a pedal carrier (14) movably supported by said support (12) for adjustment between various operational positions, a pedal lever (20) movably supported by said carrier (14) for operational movement relative to said carrier (14) in anyone of said operational positions, a conduit (24) having a first end (26) attached to said carrier (14) for movement therewith during said adjustment between said operational positions and a second end (28) for attachment to support structure, a motion transmitting core element (32) slidably supported by said conduit (24) and having a first end (34) extending from said first end (26) of said conduit (24) and attached to pedal lever (20) and a second end (36) extending from said second end (28) of said conduit (24) for transmitting motion from said pedal lever (20), a boot collar (44) disposed on said conduit (24) for attachment to a boot (46), and a boot (46) having a collar end attached to said boot collar (44) and a bulkhead end for attachment to the periphery of an aperture in a bulkhead.

4. An assembly as set forth in claim 3 wherein said boot (46) includes bellows between said ends thereof for longitudinal extension and collapse.

* * * * *